(No Model.)

J. JACKSON.
BOTTLE FILLING APPARATUS.

No. 502,969. Patented Aug. 8, 1893.

WITNESSES:
John A. Rennie
C. Sedgwick

INVENTOR
J. Jackson
BY Munn & Co
ATTORNEYS.

UNITED STATES PATENT OFFICE.

JOHN JACKSON, OF LONSDALE, RHODE ISLAND.

BOTTLE-FILLING APPARATUS.

SPECIFICATION forming part of Letters Patent No. 502,969, dated August 8, 1893.

Application filed January 5, 1893. Serial No. 457,311. (No model.)

*To all whom it may concern:*

Be it known that I, JOHN JACKSON, of Lonsdale, in the county of Providence and State of Rhode Island, have invented a new and Improved Bottle-Filling Apparatus, of which the following is a full, clear, and exact description.

My invention relates to an improvement in bottle filling apparatus or machines, and has for its object to improve the construction of the apparatus illustrated and described in the Letters Patent granted to myself November 8, 1892, No. 485,942; and a further object of the invention is to provide a means whereby a number of bottles may be simultaneously filled in an expeditious and convenient manner without spilling any of the liquid whether the bottles be transparent or not, and to provide each bottle with a filling tube of a size enabling it to hold a sufficient quantity of liquid to fill the bottle, and a means whereby the operator will be enabled to control the outlet at will.

A further and prime feature of the invention consists in providing reservoirs connected with a suitable source of supply, the reservoirs being adapted to hold a predetermined quantity of fluid, and in connection with such reservoirs to provide a means whereby connection between the reservoirs and the source of supply will be cut off while the bottles are being filled, and turned on after the bottles are filled.

The invention consists in the novel construction and combination of the several parts, as will be hereinafter fully set forth and pointed out in the claims.

Reference is to be had to the accompanying drawings forming a part of this specification, in which similar figures and letters of reference indicate corresponding parts in all the views.

Figure 1:
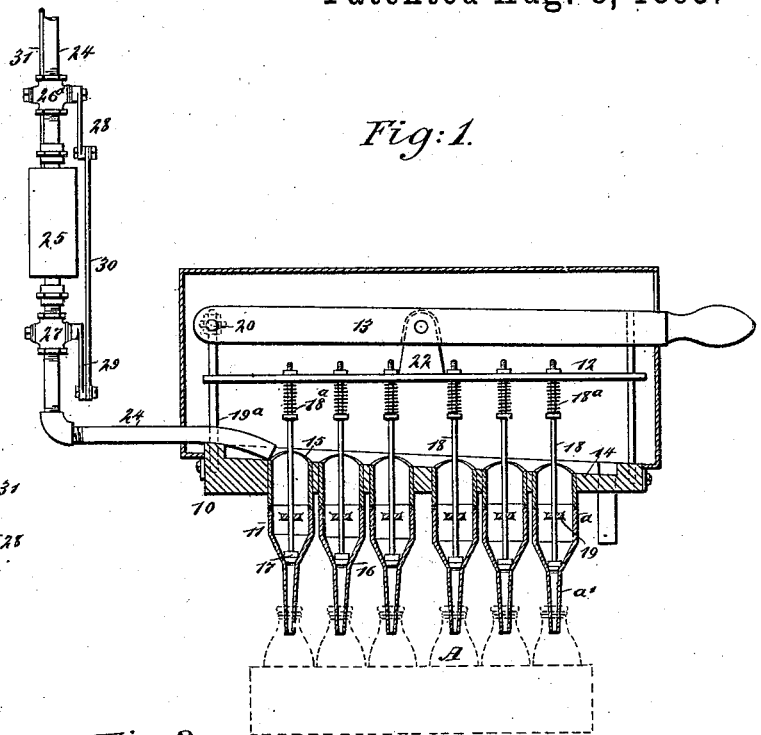
Figure 4:
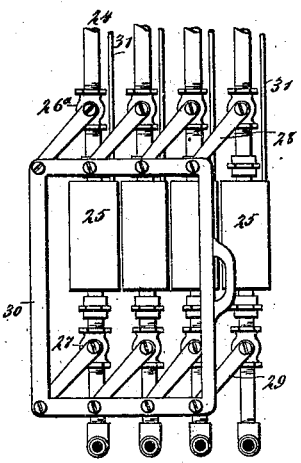
Figure 2:
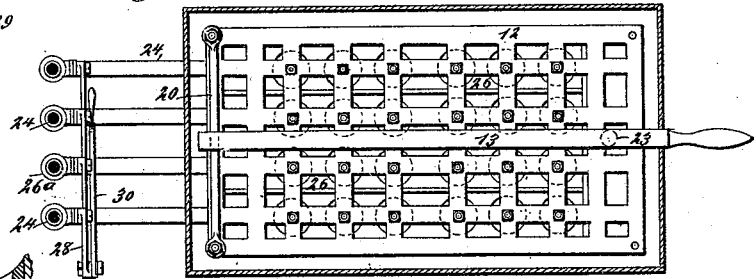
Figure 3:
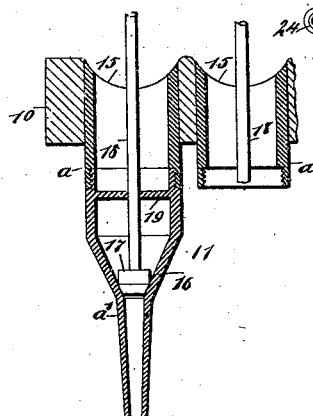

Figure 1 is a longitudinal section through the body of the machine, the said section being taken near the center. Fig. 2 is a plan view of the machine, the casing being in horizontal section. Fig. 3 is a detail sectional view through one of the filling tubes; and Fig. 4 is a side elevation of the reservoirs and mechanism for controlling the valves thereof.

The body of the machine consists essentially of a receiving trough 10, delivery or filling tubes 11, connected with the trough, a valve-carrying frame 12, and a lever 13, connected with the frame. The trough 10, may be of any size and shape; preferably, however, it is rectangular, and the base wall 14 of the trough is given a slight pitch in the direction of one end, as shown in Fig. 1.

The trough, as shown in Fig. 3, is provided with a series of openings 15 in its bottom, extending through and adapted to receive and have secured therein the delivery or filling tubes 11 above referred to. The upper portions $a$ of the tubes are of much larger diameter than the lower portions $a'$, which latter are made of such diameter as to readily fit into the mouths of the bottles A to be filled; and the size of each tube is such that it holds, when filled or practically so, just a sufficient quantity of liquid to properly fill the bottle in connection with which it is to be used.

The filling or receiving tubes may be made of any suitable material, metal being preferred, and the tubes may be attached to the trough by cement, screws, nails, or equivalent fastening devices. The filling tubes are preferably made in two sections, one having a screw connection with the other, so that the lower section or that adapted to enter the bottle may be readily removed and a larger or a smaller section may be attached to the upper or fixed one.

As the filling tubes are smaller at the bottoms than at the tops, a seat 16 is formed in each for the reception of a valve 17, and the valves are provided with stems 18, which extend some distance above the trough. The valve stems are all connected in any approved manner to the frame 12 heretofore referred to; preferably, however, springs are wound around the stems, having bearing upon shoulders formed on the stems and against the under surface of the frame. The valve stems are guided in their movement in the delivery or filling tubes by passing the stems through spiders 19, or their equivalents, attached preferably in the lower sections of the tubes.

The frame 12, is made as light as possible consistent with strength, and corresponds practically in size and shape to the contour and dimensions of the trough. The frame is located above the trough, and is made to slide to and from it by guide rods $19^a$, secured one at each corner of the trough and passing upward through openings in the frame. One set of guide bars is connected above the frame by a cross bar 20, to the center of which one end of the lift lever 13, is pivotally secured, the central portion of the lever being connected with the central portion of the valve frame by means of a lug 22, or by a link. The lever 13, is held normally in a horizontal position by a post 23, secured to the trough entering a recess or socket in the free end of the lever. When the lift lever is in its normal position the valves are seated in the filling tubes, as shown in Fig. 1, and liquid cannot flow from the tubes. The trough may be made to accommodate any desired number of filling tubes, the number shown in the drawings being twenty-four.

One or a number of supply tubes 24 lead into the trough, the upper ends of which tubes are connected each with a reservoir 25, and all of the reservoirs are connected with a tank, barrel, cask or other receptacle employed as a source of supply.

The receiving trough is divided into a number of compartments 26, each compartment containing a given number of filling tubes; a supply tube 24, is led into each compartment, although if in practice it is found desirable the trough may be made with but one or two compartments. Each supply tube 24, is provided with a valve 26ª above the reservoir of that tube and a valve 27 below the reservoir, and these reservoirs are, adapted to be removed from connection with the supply tubes if desired, in order that smaller or larger reservoirs may be used. The filling tubes are therefore made in sections and the sections are connected by suitable couplings.

Each valve 26ª, is provided with a handle 28, and each valve 27, is provided with a similar handle 29. The upper set of valve handles is attached to the upper portion of a frame 30, and the lower set of valve handles is connected with the lower portion of said frame, the attachment being a pivotal one. The frame is provided with a suitable handle through the medium of which it is operated. When the frame is in the position shown in Fig. 4, the upper set of valves is closed and the lower set is opened, and the liquid from the reservoirs will flow into the compartments of the trough. When the position of the frame is changed, that is, when the handles are made to stand in practically an opposite direction to that shown in Fig. 4, the lower set of valves is closed and the upper set opened, and at this time the supply of liquid to the trough will be cut off, while the liquid from the tank, barrel, or other source of supply will be permitted to flow into the reservoirs and fill them. Each reservoir is provided with a vent tube 31, located preferably in its upper end.

In operation, the bottles are placed beneath the filling tubes, the tubes entering their mouths, as shown in Fig. 1, and the valves in the filling tubes are squarely seated at that time. The frame 30, is then carried to the position shown in Fig. 4, and the liquid will flow from the reservoirs into the filling tubes, and each tube will be supplied with a sufficient quantity of liquid to fill a bottle; next the frame 30, is manipulated to close the lower set of valves and open the upper set, and the lever 13, is then manipulated to open the valves in the filling tubes and permit the liquid contained therein to flow into the bottles.

Having thus described my invention, I claim as new and desire to secure by Letters Patent—

1. A filling apparatus, comprising a trough having a series of dependent tubes provided with valves, a shifting lever connected with the valves, reservoirs connected with the troughs, valves located above and below the reservoirs, and a shifting device connected with both sets of valves, whereby when one set of valves is closed the other set is simultaneously opened, as and for the purpose specified.

2. In a bottle-filling apparatus, the combination, with supply tubes and reservoirs connected therewith, of valves located above and below the reservoirs, a frame having a link connection with both sets of valves, the frame being located between the sets, whereby when one set of valves is closed the other set is opened, said action taking place simultaneously with the movement of the frame, and vents located in the reservoirs, as and for the purpose set forth.

3. The filling apparatus, comprising a trough having a series of dependent tubes provided with valves, the tubes being made in two sections removably connected, the vertically yielding spring pressed valve rods extending upward from the valves, a sliding frame to which the upper ends of the valve rods are movably connected, guides upon which the frame moves, a pivoted lever crossing the frame, an attachment between the frame and the lever, and a supply mechanism leading to the trough, substantially as shown and described.

4. In a bottle-filling apparatus, the combination, with a trough, a series of tubes extending from the trough, each tube being adapted to contain a predetermined amount of liquid, the tubes being arranged in sets and the sets located in separate compartments of the trough, valves located within the tubes, and a lever connected with the valves whereby they are operated, of reservoirs corresponding in number to the compartments in the trough, each reservoir being adapted to contain sufficient liquid to properly supply all of the tubes of a set, and a supply connection between the compartments of the trough and the reservoirs, as and for the purpose set forth.

JOHN JACKSON.

Witnesses:
CHARLES TUTTLE,
JOHN GRAHAM.